April 2, 1929.　　　A. F. BROTZ　　　1,707,296
MULTIPLE UNIT GENERATOR SYSTEM
Filed Oct. 14, 1921　　　2 Sheets-Sheet 1
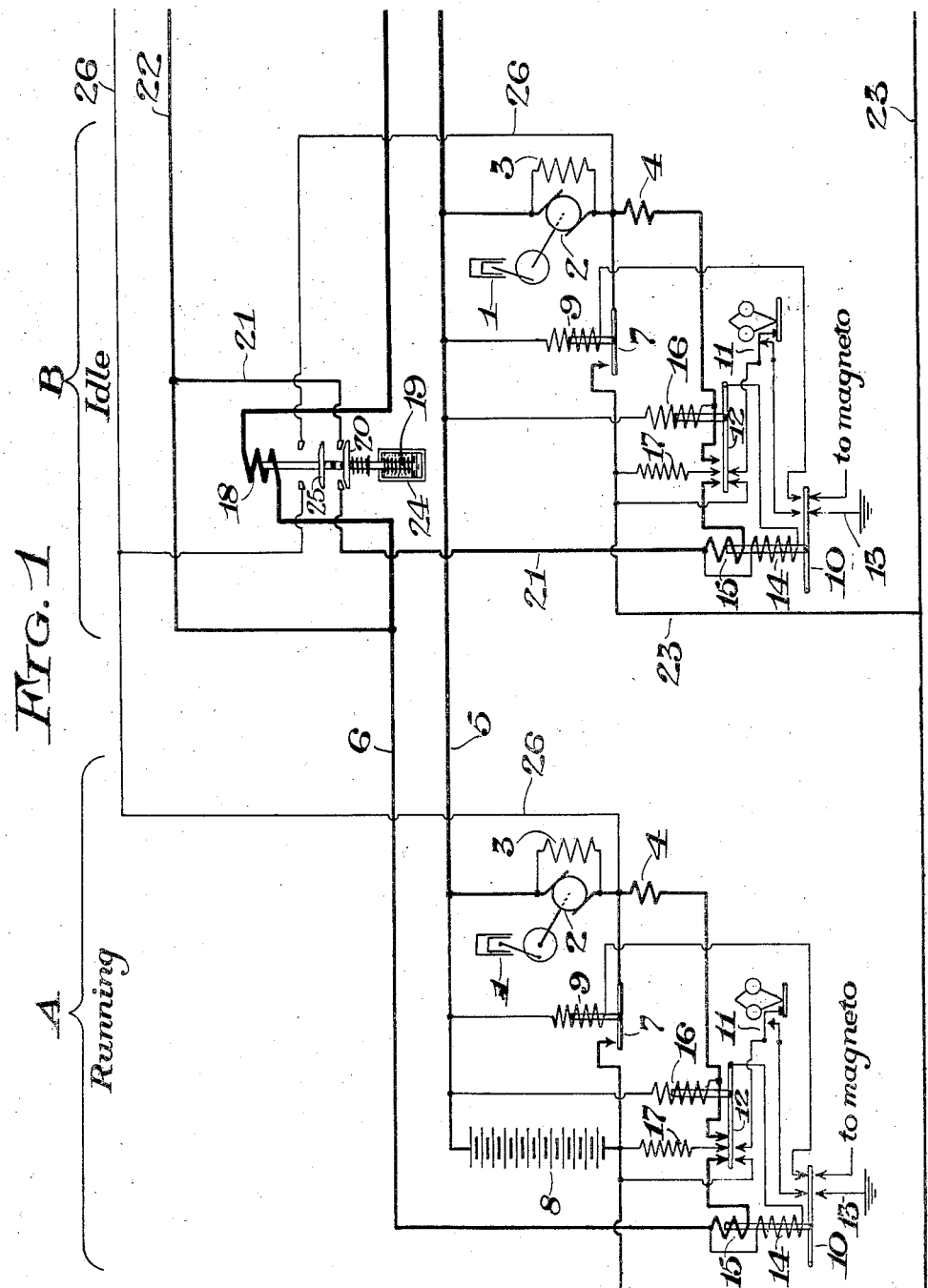

April 2, 1929.　　　　A. F. BROTZ　　　　1,707,296
MULTIPLE UNIT GENERATOR SYSTEM
Filed Oct. 14, 1921　　　2 Sheets-Sheet 2
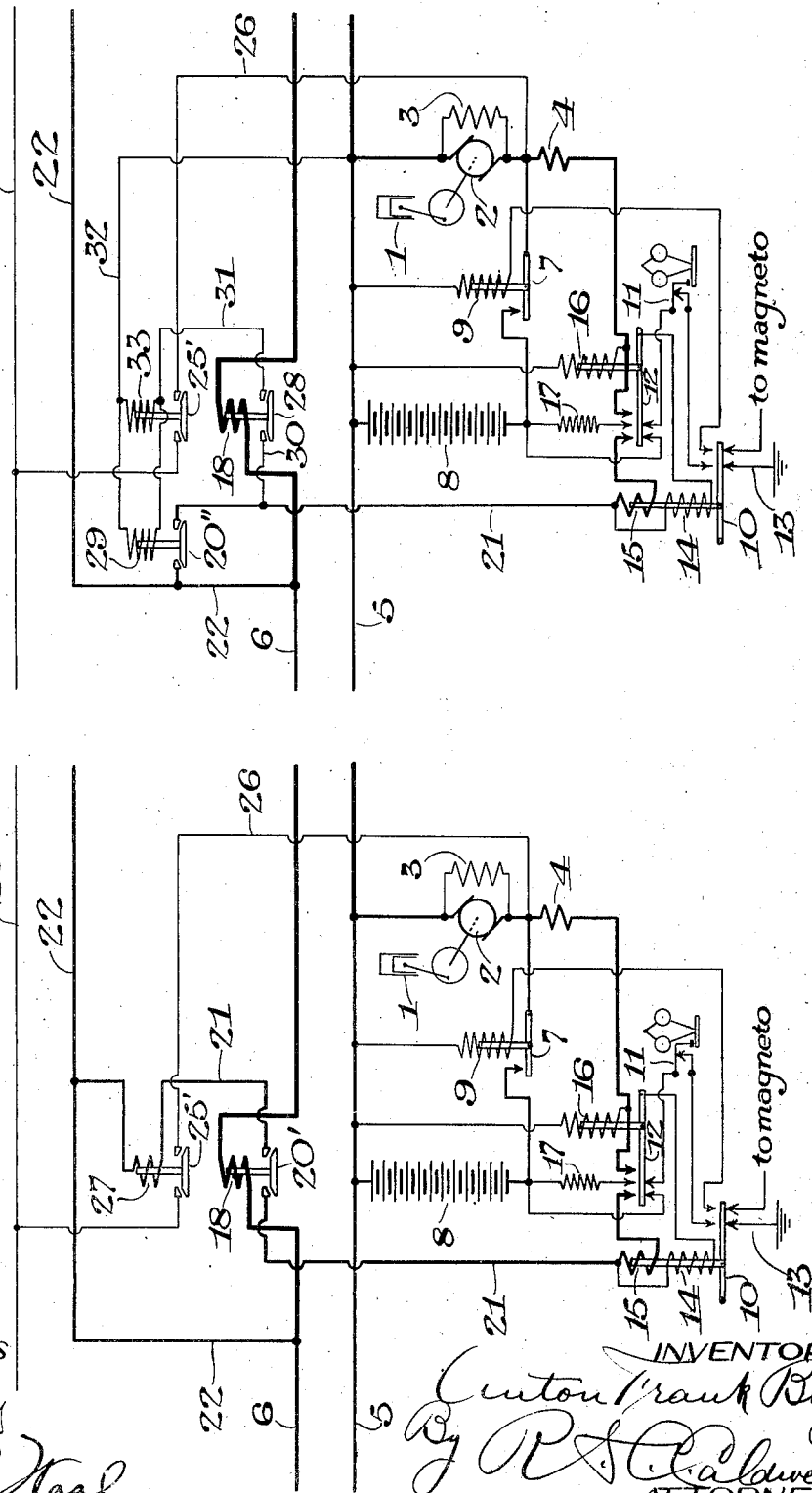

Patented Apr. 2, 1929.

1,707,296

UNITED STATES PATENT OFFICE.

ANTON FRANK BROTZ, OF KOHLER, WISCONSIN, ASSIGNOR TO KOHLER COMPANY, OF KOHLER, WISCONSIN, A CORPORATION OF WISCONSIN.

MULTIPLE-UNIT GENERATOR SYSTEM.

Application filed October 14, 1921. Serial No. 507,720.

This invention has for its object to provide a system for using a number of independent gas-engine-driven demand-starting generating units whereby one unit will function to supply the demand to the limit of its capacity and additional units will be automatically brought into connection or eliminated as required to meet the varying demand.

In the use of independent demand-starting generating units, commonly known as farm lighting plants, there is need for a system by which one unit will operate alone until the demand exceeds its capacity and then additional units will be brought into action and then eliminated according to the requirements of a greatly varying load, as in moving picture houses, small town lighting plants, and the like. The economy in supplying the small load by means of a small generating plant instead of one capable of supplying the maximum load, makes such a multiple unit system with its automatic control very desirable.

With the above and other objects in view the invention consists in the multiple unit generator system as herein claimed and all equivalents.

Referring to the accompanying drawings, in which like characters of reference indicate the same parts in different views, Figure 1 is a diagram of circuits of a generating system constituting one form of the present invention;

Figure 2 is a diagram of a slightly different arrangement of circuits for unit B thereof; and Figure 3 is a similar view of another modification of unit B.

In these drawings, two like independent generating units are represented as A and B and it will be understood that additional units corresponding with unit B may be added to any number. The generating unit may be any gas-engine-driven unit of the demand-starter type, that shown being one of a well known type now in commercial use, with which a starting battery of lower voltage than the generator is employed. It includes a gas engine 1, driving the armature 2 of a compound wound generator having a shunt field 3 and a series field 4. When connected up, one brush of the generator armature is connected directly with a service main 5 and the other, through the series field 4 and certain switch mechanism indicated in heavy lines and later described, to the other main 6.

Across the terminals of the generator armature in a circuit controlled by a starting switch 7 there is added a storage battery 8, whereby the gas engine may be cranked by the generator operating as a motor. The solenoid coil 9 of starting switch 7 is also in circuit with the storage battery 8 and is controlled by three different switches in said circuit, including a control switch 10, a governor-operated switch 11, and a main switch 12. These switches are so related that the circuit through the starting switch solenoid 9 is only closed under the following conditions: when the control switch 10 is in its raised position, which is whenever there is a demand on the mains; when the governor which is driven by the engine is in an idle position, as when the engine is not operating or before it has attained running speed; and when the main switch is in its released or lower position, as when the generator is idle or before it develops the line voltage.

The control switch 10, besides closing the motor-starting switch circuit in its upper position, serves to close a magneto ground circuit 13 in its lower position to render gas engine ignition ineffective when there is no longer demand for service on the mains.

The solenoid coil for the control switch consists of a winding 14 of fine wire with many turns and a winding 15 of coarse wire with few turns. The fine winding 14 is in series with the battery and the mains when the system is idle, so as to be energized by a weak current from the battery flowing through the mains and any translating device when the latter is thrown into circuit by connecting it across the mains. The series winding 15 is connected with the main 6 and through the switch 12 in its upper position with the series field 4. While the fine wire winding 14 is responsive to the very weak current flowing from the battery through the mains and translating device for lifting the control switch 10, the coarse wire winding 15 constitutes a current coil through which the generator current passes to the mains and is for the purpose of retaining the switch 10 in its raised position as long as the generator continues to supply a demand on the mains.

A solenoid coil 16 for lifting the main switch 12 is connected directly across the generator or between the series field 4 and the main line 5. The main switch 12, besides closing a gap in the starting switch circuit in its lower position and besides closing the connection between the generator and the main line 6 in its upper position, serves in the latter position to close a recharging circuit for the battery through a resistance 17 to compensate for a difference between the battery voltage and the generator voltage.

While the circuit connections of the unit connected with the load and the battery have thus been briefly outlined, with accompanying mention of functions performed, it may be well to describe the consecutive operations. With the system idle and all switches of unit A released, as shown for unit B, an automatic start is made upon the closure of the switch of any translating device across the mains, the battery being included in a circuit with the mains and the translating device and the fine wire winding 14 of control switch 10. This energizes coil 14 to lift switch 10 and remove the ground connection from the magneto, while at the same time closing the motor-starting switch circuit from the battery through coil 9. The coil 9 being energized, closes the motor-starting circuit to connect the battery directly with the generator to operate it as a motor for cranking the engine.

When the engine functions to drive the generator, the generator current passing through the coil 16 energizes it to lift switch 12, thereby opening the motor-starting circuit through coil 9 and closing the generator service circuit between the generator and main line 6. As these two functions performed by switch 12 cause coil 15 to be energized at approximately the same time that the circuit through coil 14 is opened, switch 10 remains in its raised position and will continue so as long as current passes through coil 15, which means as long as a translating device remains connected across the mains.

Should there be a momentary interruption of the circuit for any reason, with a resumption of circuit connections before the engine speed is reduced below cranking speed, the break in the motor-starting switch circuit caused by the open governor switch 11 avoids a closing of the motor-starting circuit unnecessarily and so avoids a direct connection between the battery and the generator terminals while the generator is developing its higher voltage. The battery, however, remains in recharging circuit with the generator during the operation of the latter with the charging resistance 17 in series therewith to cut down the generator voltage to approximately that of the battery.

When the demand for current supply on the mains ceases by the opening of the switch of the last translating device current ceases to flow through the series coil 15, which therefore permits the switch 10 to drop and ground the magneto circuit to stop the engine and thereby cause the release of switch 12 so that all parts are restored to their original positions and the unit comes to rest.

The auxiliary units, which are to be successively introduced into the circuit as needed to supply an increasing demand, are the same as the unit A above described and are similarly connected, except that an additional battery 8 may be omitted, the coil 15 is not directly connected with main 6, and for each such auxiliary unit a properly adjusted magnet-operated unit-introducing switch is employed, with its coil 18 in series with the main line circuit so as to constitute a current coil varying in strength with the varying load, and opposed by spring means adjusted to resist operation until the current strength through the mains reaches a predetermined minimum at which it is intended that such auxiliary unit should respond. Thus the current coil 18 for unit B is directly in the main line 6 in series with the full load across the mains and serves to attract its armature against the pull of a spring 19 which resists such tendency until the predetermined current flow is reached, which is presumably the maximum for which unit A is designed. The solenoid core is then moved upwardly under the influence of the current coil and serves to close switch 20, which introduces unit B. This may be done in any manner whereby unit B is brought into operation by being connected in parallel with unit A. In the form of the invention shown in Fig. 1 it is accomplished by establishing its connection with main line 6 by connecting wire 21 from coil 15 to line 22 from said main line 6 ahead of the current coil 18 or between said current coil and generating unit A.

When this circuit is closed, unit B functions for starting much the same as above described for unit A, except that current from the generator of unit A is used for exciting coil 14 instead of this being done by the battery and if the battery has been omitted from unit B the various other circuits depending on the battery are supplied by the battery of unit A by means of a battery bus-line 23 connecting the terminal of battery 8 of unit A with those parts of unit B corresponding with the parts of unit A directly connected with such battery terminal. As these parts have a common return through main line 5 connected with the other terminal of the battery, it is apparent that unit B will be started from battery 8 of unit A in the same manner that unit A was started.

The circuit for exciting coil 14 of unit B with current from the generator of unit A upon the closing of the unit-introducing switch is as follows: from generator armature 2 of unit A through battery 8, battery bus wire 23, left-hand back contact of switch 12 and switch 12 in contact therewith, coil 14, wire 21 including closed switch 20, wire 22, line wire 6, coil 15 of unit A, closed switch 12 of unit A back to the generator through the series field 4. In fact, the battery bus line 23 and the main line 5 would directly connect the battery of unit A in parallel with the battery of unit B if the latter were present and they would act together as a single source of supply for all purposes. This makes it possible to omit the battery for unit B and additional units without affecting the circuits in any way.

Thus the coil 14, energized from the generator of unit A as above mentioned, lifts switch 10 to render the magneto effective for ignition and closes the circuit from the battery bus 23 through the main switch 12, governor switch 11, control switch 10, and starting switch coil 9. This coil being energized, lifts the starting switch 7 to close the starting circuit, placing the generator as a motor in a parallel circuit with the battery between main line 5 and battery bus 23. The motor cranks the engine, which then drives the motor as a generator to energize coil 16 of the main switch until it lifts switch 12, breaking the battery connection with the generator as before, and closing the circuit between the generator series field 4, the current coil 15 of the control switch and the main line 6, thus placing the generator of unit B in parallel with the generator of unit A so as to divide the load between them. The battery recharging connection through resistance 17 may be dispensed with in the auxiliary units if the battery has been omitted, but, in practice, the units are alike in this respect also.

Provision may be made for establishing an equalizing connection between the generator field windings of the two units after the auxiliary unit has been brought up to speed in order that the units may equally share the load, and this may be accomplished by an independent switch, or, as shown in Figure 1, by a switch combined with switch 20 and operated by the same solenoid 18. Thus the movement of the core of solenoid 18 does not stop with the closing of switch 20 to introduce the new unit in circuit, but it continues under the restraint of a dash-pot 24 until a switch 25 carried thereby closes a connection for equalizing the generators by connecting their like brushes together. Equalizing wires 26 from the positive brushes of the generators connect with the contacts of the switch 25 and that wire from unit A continues along with wires 22 and 23 and the main line wires for connection with other auxiliary units in the manner shown for unit B.

The earlier closing of switch 20 followed by the later closing of switch 25 after a time interval sufficient to enable the introduced unit to start and acquire generating speed is accomplished by yieldingly mounting the switch 20 on the solenoid core, preferably under spring action, so that it remains seated while the core continues to move upwardly under the influence of current coil 18 and restrained by the dash-pot and spring 19 until the switch 25 is seated on its contacts. Here it will be held as long as the load continues greater than that for which the introducing switch is adjusted, the generator equalizing circuit 26 insuring that the burden is equally divided between the units in operation.

It will be noted that the auxiliary units, when introduced, connect with main 6 ahead of all of the current coils 18, so that said current coils carry the full load however many units are introduced and will therefore continue as many units in operation as are required to supply the load.

The introducing switch of the first auxiliary unit will be adjusted for operating to introduce that unit when the current strength in coil 18 thereof reaches the maximum for which unit A is designed and the introducing switch of the next unit will be adjusted to operate when the current flow through its coil 18 reaches the maximum for which units A and B combined are designed, and so on indefinitely for as many auxiliary units as are required or desired to supply the system.

A reduction in load beneath the current flow required for the last introduced unit will reduce the strength of the current coil 18 of the introducing switch of that unit so that its spring 19 will open the introducing switch, thus cutting that unit out of circuit and breaking its generator equalizing connection so that it ceases to function and remains idle until again required by an increase in the load.

The opening of switch 25 breaks the equalizing connection of the generator and then the opening of switch 20 opens the circuit of the retaining coil 15 of switch 10 so that said switch is allowed to drop and ground the magneto circuit to render ignition ineffective and thus stop the operation of the gas engine to bring the unit to rest. As the generator ceases to function, the coil 16 of the main switch 12 is de-energized, permitting said switch 12 to drop to the position shown in unit B, so that all switches of that unit are restored to the positions shown.

When the last translating device is disconnected from the mains, unit A will also cease to function, no current then flowing through the retaining coil 15 of its switch 10, which drops to ground the magneto circuit and stop the engine to cause the release of main switch 12.

It will be seen that, in this system, any number of automatic units may be employed to supply whatever load is desired. without sacrificing the automatic feature of starting and stopping under demand control and that the addition and subtraction of units is also automatically made under the demand control and this with little or no change in the units and by merely adding the introducing switches and the busses 22, 23 and 26 common to all of the auxiliary units. Also but one starting battery is necessary, the battery of unit A being utilized for cranking all units they are successively introduced.

However, when desired, each unit may have its battery connected therewith, as with unit A, and the battery bus 23 may be dispensed with. Also it will be apparent that the two switches operated by solenoid 18 may have separate operating coils, and the coil for the equalizing switch 25 may be in any circuit that will cause it to be energized subsequent to the closing of the unit introducing switch.

As illustrating one of such modifications of the invention, Figure 2 represents unit B with a separate magnet coil for operating the generator equalizing switch, thus dispensing with the use of the dash-pot.

In this form of the invention the only change in unit B is in the unit-introducing switch, aside from the fact that its battery is shown, thus dispensing with the use of the battery bus. The change in the unit-introducing switch consists in providing a coil 27 in the connecting line 21 which is controlled by the unit-introducing switch 20', as before for introducing unit B and providing an independent equalizing switch 25' operated thereby. This relieves the current coil 18 of the duty of operating the equalizing switch, so that it is only required to operate the unit-introducing switch 20' and therefore the dash-pot is omitted.

In some respects this form of the invention is preferred to that shown in Figure 1, for the delayed operation of the equalizing switch is assured from the fact that it is not energized until the generator of unit B acquires generating speed. Thought this form of the invention requires two series coils 18 and 27 for each auxiliary unit, this may be preferred to the use of the dash-pot means for delaying the operation of the equalizing switch, as shown in Figure 1.

The operation of the system shown in Figure 2 will be understood from the previous description.

In Figure 3 is shown a further modification, but again the changes are confined to the construction of the unit-introducing switch mechanism. In this modification the current coil 18 does not operate the unit-introducing switch directly, but only indirectly by closing its switch 28 so as to connect a coil 29 across the terminals of unit B, thus making it constitute a demand load for said unit that will automatically start its engine in operation in the same manner as described for unit A. The circuit of this demand load for starting unit B into operation by the closing of switch 28 is as follows: from battery 8, switch 12, fine wire winding 14 of control switch 10, connecting wire 21, wire 30, switch 28, wire 31, coil 29, wire 32, and line wire 5, to battery. The current flow through this circuit, while insufficient to energize coil 29 to the extent of causing it to close the unit-introducing switch, is sufficient to energize coil 14 and lift the control switch 10 to remove the ground connection from the magneto and to close the motor-starting switch circuit from the battery through coil 9. The unit is thus started in operation in the same manner as described with reference to unit A, but the closing of main switch 12, instead of connecting the generator with the line, connects it through closed switch 28 with the coil 29 so as to energize said coil and cause it to lift the unit-introducing switch 20" and thereby connect wire 21 with wire 22 to introduce unit B in parallel with unit A. The circuit controlled by the closing of switch 28 also includes a coil 33 which may be parallel with coil 29 or in series therewith if desired and this coil is relied on to operate the equalizing switch 25'.

The unit-introducing switch 20" and the equalizing switch 25' will remain closed as long as coil 18 is energized by the existence of a demand requiring the use of unit B. As soon as the demand diminishes beyond that point, switch 28 is released by coil 18 and by opening the circuit through coils 29 and 33, switches 20" and 25' are released to disconnect unit B and permit it to come to rest.

While the invention may be applicable to independent generating units generally without reference to the exact details of construction shown and described, it is particularly suitable for units of this type making use of low voltage storage batteries and higher voltage generators, though it is to be understood that the claims are not limited to any particular type of generating unit unless so stated by the terms thereof.

The term "unit" as herein used includes the generator, its engine and the switch mechanism and circuits necessary to effect starting and stopping upon the occurrence and discontinuance of a demand so as to complete a self-starting gas-engine-operated generating plant of the demand starter type. The term "similar unit" as herein used means another unit of this type. In practice such units have two terminals for connection with the mains and in the present system the two terminals of unit A are so connected permanently while each of the other units has one terminal permanently connected with the mains and the other terminal caused to be connected with the mains by the operation of the unit-introducing switch for that unit. When so connected all units have like terminals connected with the same mains.

The term "low voltage battery" as used herein means a battery having a materially lower voltage than the generator with which it is used and which it operates as a motor for cranking.

In view of the fact that auxiliary units may function with current either from a battery of their own or from the battery or generator of units already functioning, the term "similar unit" as herein used includes either condition and does not exclude the arrangement shown in Fig. 1.

What I claim as new and desire to secure by Letters Patent is:

1. In combination, a gas-engine-operated generator unit of the low voltage battery demand starter type, mains supplied thereby, a second similar unit, and means dependent on the current strength through the mains for introducing the second unit by causing it to be connected across the mains.

2. In combination, a gas-engine-operated generator unit of the low voltage battery demand starter type, mains supplied thereby, a second similar unit, and means dependent on the load on the mains for automatically introducing the second unit by causing it to be connected across the mains when the load on the mains reaches a predetermined value and for eliminating it when the load is reduced to less than that value.

3. A system for using a pair of gas-engine-operated generator units of the low voltage battery demand starter type on the same distributing mains, with automatic control for introducing the second unit when needed to supply the load on the mains and eliminating it when it becomes unnecessary, comprising, in combination with the first unit and mains, a magnet coil in circuit with the first unit and sensitive to the load on the mains, a second unit, and means controlled by the magnet coil for introducing the second unit by causing it to be connected across the mains.

4. A system for using a pair of gas-engine-operated generator units of the low voltage battery demand starter type on the same distributing mains, with automatic control for introducing the second unit when needed to supply the load on the mains and eliminating it when it becomes unnecessary, comprising, in combination with the first unit and mains, a magnet coil in circuit with the first unit and sensitive to the load on the mains, a second unit, and switch means controlled by the magnet coil for causing the second unit to function by connecting it across the mains.

5. A system for using a pair of gas-engine-operated generator units of the low voltage battery demand starter type on the same distributing mains, with automatic control for introducing the second unit when needed to supply the load on the mains and eliminating it when it becomes unnecessary, comprising, in combination with the first and second units and mains, a magnetic switch in circuit with the first unit and sensitive to the load and closed when the load has a predetermined value, and connections including the second unit controlled by the closing of said switch for including the second unit in parallel with the first unit.

6. A system for using a pair of gas-engine-operated generator units of the low voltage battery demand starter type on the same distributing mains, with automatic control for introducing the second unit when needed to supply the load on the mains and eliminating it when it becomes unnecessary, comprising, in combination with the first unit and mains, a magnetic switch in circuit with the first unit and sensitive to the load and actuated when the load reaches a predetermined value, and a second unit caused to be connected in parallel with the first unit by said switch.

7. A system for using a plurality of gas-engine-operated generator units of the low voltage battery demand starter type on the same distributing mains, with automatic control for introducing them as needed to supply the load on the mains and eliminating them as they become unnecessary, comprising, in combination with the first unit and mains, magnetic switches in circuit with the first unit and sensitive to the load and actuated respectively when the load reaches respective predetermined values, and additional units caused to be connected in parallel with the first unit by said switches.

8. In combination, a gas-engine-operated generator unit of the low voltage battery demand starter type, mains supplied thereby, a current coil in series with the mains and sensitive to the load on the mains, a switch operated thereby, and a second similar unit caused to be connected with the mains by said switch.

9. In combination, a self-starting gas-engine-operated generator unit, mains supplied thereby, a current coil in series with the mains and sensitive to the load on the mains, a switch operated thereby, a second self-starting gas-engine-operated generator unit caused to be connected with the mains by said switch, a second switch operated by the current coil, and a generator-equalizing connection for said units established by said second switch.

10. In combination, a self-starting gas-engine-operated generator unit, mains supplied thereby, a switch operated by the current flow through the mains, a second self-starting gas-engine-operated generator unit caused to be connected with the mains by said switch, and a second switch operating later to establish an equalizing connection between the generators of the units.

11. In combination, a self-starting gas-engine-operated generator unit, mains supplied thereby, a current coil in series with the mains and sensitive to the load on the mains, a switch operated thereby, a second self-starting gas-engine-operated generator unit caused to be connected with the mains by said switch, and a delayed operating switch also operated by the current coil for establishing an equalizing connection between the generators of the units.

12. In combination, a gas-engine-operated generator unit of the low voltage battery demand starter type, mains supplied thereby, a coil connected with the mains to be energized when the load on the mains reaches a predetermined value, an auxiliary unit-introducing switch operated by said coil, and a like unit caused to be connected across the mains by said switch.

13. In combination, a demand-starting gas-engine-operated generator unit having a storage battery for supplying current to the generator to drive it as a motor for starting upon the occurrence of a demand, mains supplied thereby, a switch controlled by the flow of current through the mains, a similar generator unit without the storage battery caused to be connected with the mains by means of said switch, and a wire joining the battery connections of the units.

14. In combination, a self-starting gas-engine-operated generator unit, means supplied thereby, a plurality of auxiliary generator units for successive introduction to the mains in parallel with the first generator unit, a current coil in one of the mains for each auxiliary unit energized successively under increasing loads, a unit-introducing switch operated by each current coil, and a bus-wire common to all auxiliary units connected with said main between the first generator unit and the first current coil and being connected by each unit-introducing switch with the auxiliary generator unit controlled thereby.

15. In combination, a self-starting gas-engine-operated generator unit, mains supplied thereby, a switch operated by the current flow through the mains, a second self-starting gas-engine-operated generator unit caused to be connected with the mains by said switch, and a second switch operated by the current generated by the second unit to establish an equalizing connection between the generators of the units.

16. In combination, a self-starting gas-engine-operated generator unit, mains supplied thereby, a current coil in series with the mains and sensitive to the load on the mains, a switch operated thereby, a second self-starting gas-engine-operated generator unit caused to be connected with the mains by said switch, a magnet coil in circuit with the second unit, an equalizing switch operated thereby, and an equalizing connection between the generators of the units closed by said equalizing switch.

17. In combination, a gas-engine-operated generator unit of the low voltage battery demand starter type, service mains supplied thereby, said unit including a control switch having a winding in circuit with the battery and the mains to be energized through a load on the mains, a second identical unit without the battery, and means dependent on the current strength through the mains for starting the second unit by introducing it in circuit with the first unit with its said winding of the control switch energized with current from the first unit.

In testimony whereof, I affix my signature.

ANTON FRANK BROTZ.